US007758741B2

United States Patent
Omori et al.

(10) Patent No.: US 7,758,741 B2
(45) Date of Patent: Jul. 20, 2010

(54) METHOD AND APPARATUS FOR NOZZLE TYPE ELID GRINDING

(75) Inventors: Hitoshi Omori, Wako (JP); Yoshihiro Uehara, Wako (JP); Kazutoshi Katahira, Wako (JP); Muneaki Asami, Chiyoda-ku (JP); Norihide Mitsuishi, Chiyoda-ku (JP); Souichi Ishikawa, Chiyoda-ku (JP)

(73) Assignees: Riken, Saitama (JP); The NEXSYS Corporation, Tokyo (JP)

( * ) Notice: Subject to any disclaimer, the term of this patent is extended or adjusted under 35 U.S.C. 154(b) by 929 days.

(21) Appl. No.: 11/297,437

(22) Filed: Dec. 9, 2005

(65) Prior Publication Data

US 2006/0124473 A1 Jun. 15, 2006

(30) Foreign Application Priority Data

Dec. 9, 2004 (JP) .............................. 2004-356625

(51) Int. Cl.
*B23H 3/00* (2006.01)
*B23H 5/00* (2006.01)

(52) U.S. Cl. .................................... 205/662
(58) Field of Classification Search ................. 205/662
See application file for complete search history.

(56) References Cited

U.S. PATENT DOCUMENTS 3,061,529 A * 10/1962 Crompton .................... 205/663
5,198,078 A * 3/1993 Gale et al. .................... 205/404
5,236,566 A * 8/1993 Tsuchiya et al. ............. 204/206

FOREIGN PATENT DOCUMENTS

| JP | 61-54908 | 3/1986 |
| JP | 07-001333 | 1/1995 |
| JP | 2002-001657 | 1/2002 |
| JP | 2003-019623 | 1/2003 |

OTHER PUBLICATIONS

Machine translation of JP 07-001333 A.*
English translation of Japanese Office Action issued in the corresponding Japanese application on Aug. 4, 2009.

* cited by examiner

*Primary Examiner*—Harry Wilkins
*Assistant Examiner*—Zulmariam Mendez
(74) *Attorney, Agent, or Firm*—Griffin & Szipl, P.C.

(57) ABSTRACT

There is here disclosed a nozzle type ELID grinding apparatus comprising a conductive grindstone 12 having a contact surface with a workpiece 1; and an ion supply nozzle 16 that supplies an electrolytic medium 2 containing hydroxyl ions ($OH^-$) onto a surface of the conductive grindstone, the workpiece being ground while the surface of the grindstone is dressed by electrolysis or chemical reaction. Furthermore, the apparatus comprises a grindstone power source 14 for setting the conductive grindstone to be a positive potential (+).

11 Claims, 7 Drawing Sheets

METHOD AND APPARATUS FOR NOZZLE TYPE ELID GRINDING

This application claims priority from Japanese Patent Application No. 2004/356625, filed Dec. 9, 2004 the entire disclosure of which is incorporated herein by reference.

BACKGROUND OF THE INVENTION (i) Field of the Invention

The present invention relates to electrolytic in-process dressing grinding, more specifically, to a method and an apparatus for nozzle type ELID grinding with no grindstone-opposed electrode.

(ii) Description of the Related Art

As technology advances, demand of ultraprecision machining is being remarkably sophisticated. As mirror grinding means that meets the demand, an electrolytic in-process dressing grinding method (hereinafter referred to as ELID grinding method) was developed and published by the present applicant (Riken symposium "Advances of New Technology for Mirror Grinding", held on Mar. 5, 1991).

In the ELID grinding method, as schematically shown in FIG. 1, a conductive grindstone 54 is used in place of an electrode in a conventional electrolytic grinding process, and there is provided an electrode 52 opposed to the grindstone with a gap (hereinafter referred to as grindstone-opposed electrode). A conductive liquid 53 is flowed between the grindstone and the electrode. A voltage is applied between the grindstone 54 and the electrode 52. While the grindstone is dressed by electrolysis, a workpiece is ground by the grindstone. Thus, by carrying out electrolytic dressing of the grindstone simultaneously with the grinding work by using as the anode the metal bonded grindstone 54 and as the cathode the electrode 52 opposed to the surface of the grindstone with a gap, the grinding performance can be maintained and stabilized. In FIG. 1, reference numeral 51 denotes a workpiece (a substance to be ground); 55 does an ELID power source; 56 does a feed element; and 57 does a nozzle for the conductive liquid.

In the ELID grinding method, even in the case of using fine abrasive grains, clogging of the grindstone does not occur because dressing is performed by electrolysis. Thus, by decreasing the abrasive grain size, a very superior work surface, such as a mirror surface, can be obtained by grinding. Therefore, applications of the ELID grinding method to various grinding processes have been proposed as means that can maintain the performance of the grindstone from highly efficient grinding to mirror grinding, and can make a highly precise surface for a short time, which was impossible by any prior art, (e.g., see Patent Documents 1 and 2).

In "Method and Apparatus for Control of Electrolytic Dressing" of Patent Document 1, as shown in FIG. 2, while a conductive liquid is flowed between a grindstone 62 and an electrode 63 from a nozzle 64, a power source 65 and a feed element 66 apply a voltage between the grindstone and the electrode. A workpiece 61 is ground while the grindstone is dressed by electrolysis. In this electrolytic dressing grinding process, a position controller 67 detects a current or voltage between the electrode and the grindstone, and an electrode moving system 68 controls the distance between the grindstone and the electrode such that the detected value is within a set range.

As shown in FIG. 3, "ELID Grinding Apparatus for ↻Fine Shape Machining" of Patent Document 2 comprises a conductive grindstone 72; an X-Y table; an electrolysis electrode 76 provided close to the outer circumferential surface of the grindstone so as to be freely rotatable around the Z axis; and an electrode guide 78. The electrode guide 78 is made up of two contacts one end of each of which is fixed to the electrolysis electrode 76. Each contact extends radially of a circle around the Z axis. The contacts pinch part of a workpiece at positions distant from each other.

[Patent Document 1]

JP-A-7-1333 "Method and Apparatus for Control of Electrolytic Dressing"

[Patent Document 2]

JP-A-2002-1657 "ELID Grinding Apparatus for Fine Shape Machining"

As described above, in the conventional ELID grinding methods, an electrode (grindstone-opposed electrode) is indispensable that is opposed to the outer circumference of the grindstone with a small gap from the grindstone.

Because of this construction, however, if the grindstone is reduced in size, for example, to about 1 to 2 mm in diameter, reduction in size of the electrode and means for setting the electrode may be difficult or impossible. There is a problem that the reduction in size of the apparatus is restricted. Thus, there is a problem that it is difficult to apply the ELID grinding method to, e.g. machining of a micro lens or a mold for the micro lens, needs of which has increased in recent years.

SUMMARY OF THE INVENTION

The present invention has been made for solving the above problem. An object of the present invention is to provide a method and an apparatus for nozzle type ELID grinding in which ELID grinding can be performed without using any grindstone-opposed electrode, which was conventionally considered to be indispensable, and thus ELID grinding can be easily performed, for example, even if the grindstone is reduced in diameter.

According to the present invention, a nozzle type ELID grinding method comprises supplying an electrolytic medium containing hydroxyl ions ($OH^-$) onto a surface of a conductive grindstone; and grinding a workpiece while the surface of the grindstone is dressed by electrolysis or chemical reaction.

According to a preferred embodiment of the present invention, the method further comprises setting the conductive grindstone having a contact surface with the workpiece to be a positive potential (+).

Further, the electrolytic medium is an alkali aqueous solution or a mist thereof.

According to the present invention, a nozzle type ELID grinding apparatus comprises a conductive grindstone having a contact surface with a workpiece; and an ion supply nozzle that supplies an electrolytic medium containing hydroxyl ions ($OH^-$) onto a surface of the conductive grindstone. The workpiece is ground while the surface of the grindstone is dressed by electrolysis or chemical reaction.

According to a preferred embodiment of the present invention, the apparatus further comprises a grindstone power source that sets the conductive grindstone to be a positive voltage (+).

Further, the ion supply nozzle comprises a nozzle main body having a flow passage for supplying the electrolytic medium onto the surface of the conductive grindstone; a pair of nozzle electrodes disposed in the flow passage so as to be opposed to each other; and a nozzle power source that applies an ionization voltage to the pair of nozzle electrodes.

According to the method and apparatus of the present invention, because the ion supply nozzle is provided and the electrolytic medium (an alkali aqueous solution or a mist thereof) containing hydroxyl ions (OH⁻) is supplied onto the surface of the conductive grindstone, conductive components of the surface of the grindstone are attracted to OH⁻ ions and positively react with the OH⁻ ions to be dissolved out.

Therefore, even in a construction in which the tip end of the ion supply nozzle is at a sufficient distance from the surface of the grindstone, the surface of the grindstone is oxidized to be converted into a nonconductor after the dissolution from the surface of the grindstone by electrolysis or chemical reaction, and thereby electrolytic dressing (ELID) of the grindstone becomes possible.

The present invention can cope with reduction in size of a grindstone. In addition, because the outer peripheral portion of the grindstone can be made free by setting an electrode at the tip end of the nozzle, the whole circumference of the grindstone can be used for grinding in addition to the reduction in size of the grindstone.

Therefore, ELID grinding can be carried out without using a grindstone-opposed electrode that is conventionally considered to be indispensable. Thus, for example, even if the grindstone is reduced in diameter, ELID grinding can be easily carried out.

DETAILED DESCRIPTION OF THE PREFERRED EMBODIMENTS

Figure 1:
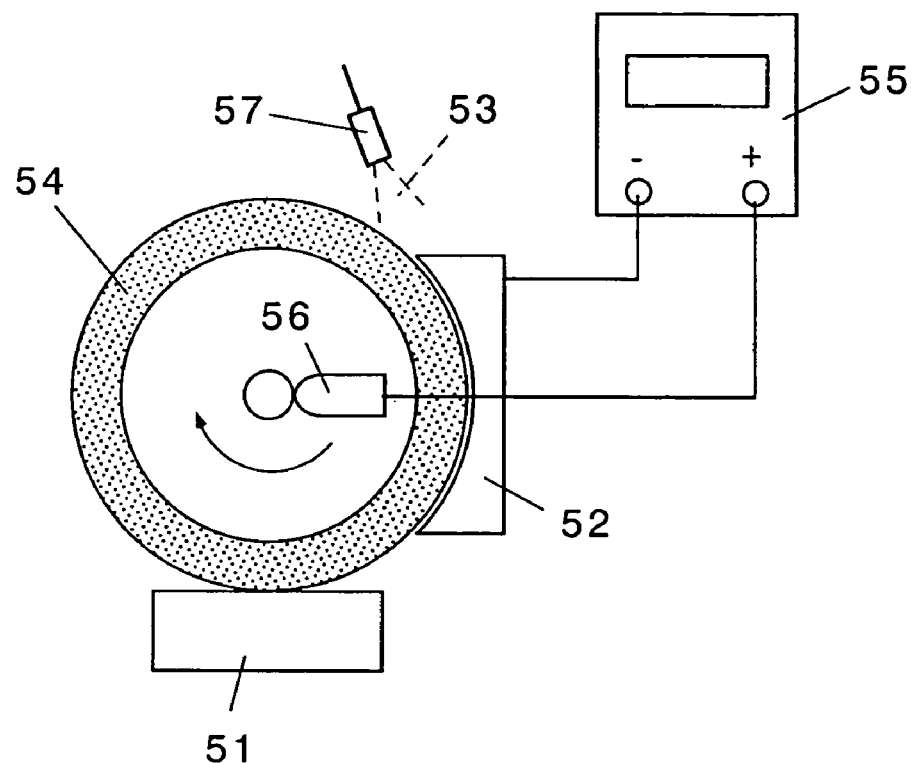
FIG. 1 is a schematic view showing a conventional ELID grinding method.
Figure 2:
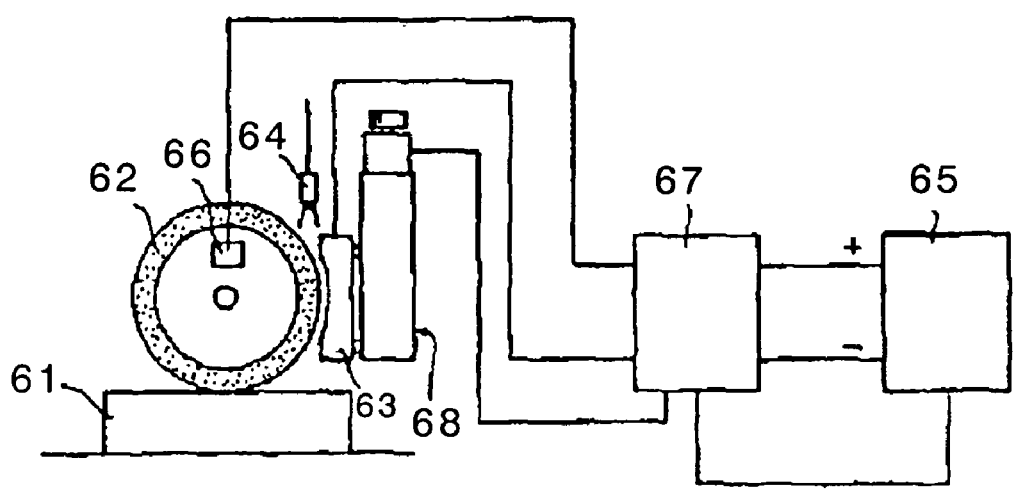
FIG. 2 is a schematic view showing a construction of "Method and Apparatus for Control of Electrolytic Dressing" of Patent Document 1.
Figure 3:
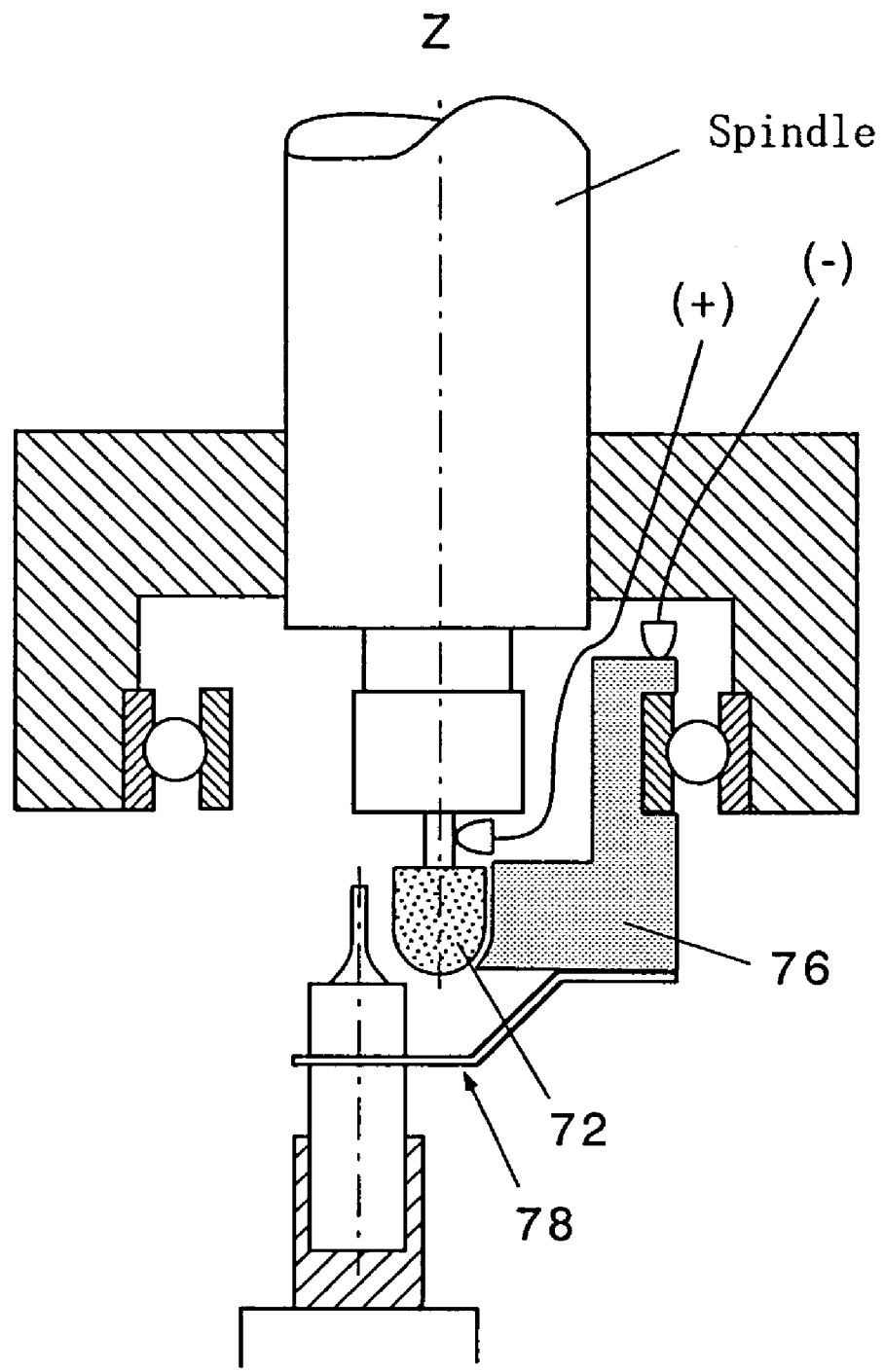
FIG. 3 is a schematic view showing a construction of "ELID Grinding Apparatus for Fine Shape Machining" of Patent Document 2.

Hereinafter, preferred embodiments of the present invention will be described with reference to drawings. In the drawings, common components are denoted by the same reference numeral to omit the repetitious description.

Figure 4:
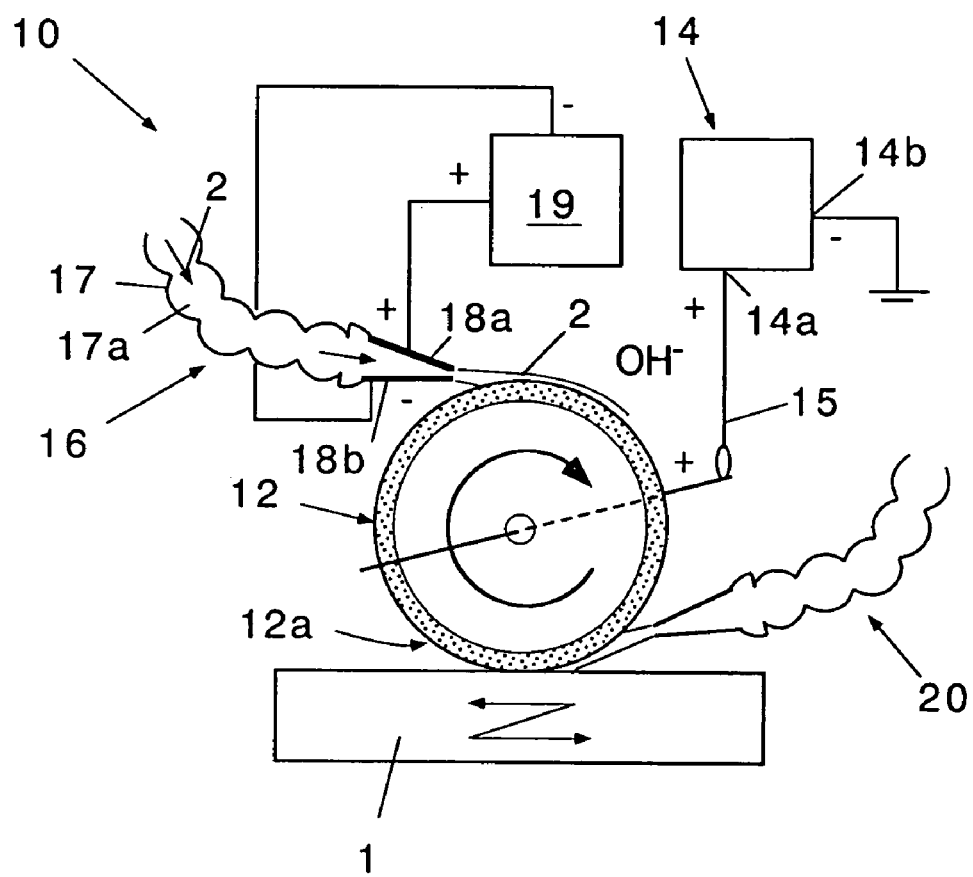
FIG. 4 is a schematic view of a nozzle type ELID grinding apparatus according to a first embodiment of the present invention.

FIG. 4 is a schematic view of a nozzle type ELID grinding apparatus according to a first embodiment of the present invention. As shown in FIG. 4, the nozzle type ELID grinding apparatus 10 of the present invention includes a conductive grindstone 12, a grindstone power source 14, and an ion supply nozzle 16.

The conductive grindstone 12 is made up of non-conductive abrasive grains (e.g., diamond abrasive grains) and a conductive bonding portion (e.g., made of a metal, such as cast iron, copper, bronze, Co, or Ni; carbon, or the like), and the grindstone 12 has electrical conductivity as a whole. Dressing of the grindstone 12 can be performed by electrolyzing the bonding portion. The grindstone 12 has a contact surface 12a to be brought into contact with a workpiece 1.

The workpiece 1 may be made of either a non-conductive material (such as glass or ceramic) or a conductive material (e.g., a metallic material or a semiconductor). In the case that the workpiece 1 is made of a conductive material, the workpiece 1 is electrically insulated so as to be at the same potential as the conductive grindstone 12.

The grindstone power source 14 is provided with a feed line 15 for feeding to the conductive grindstone 12. The grindstone power source 14 applies a positive voltage (+) from a plus terminal 14a through the feed line 15 to the grindstone 12. The positive voltage (+) is preferably a DC pulse voltage though it may be a constant voltage.

In this embodiment, the cathode (a minus terminal 14b) of the grindstone power source is grounded. Otherwise, in place of being grounded, it may be connected to the cathode (a minus terminal) of a nozzle power source 19 as will be described later.

Figure 5:
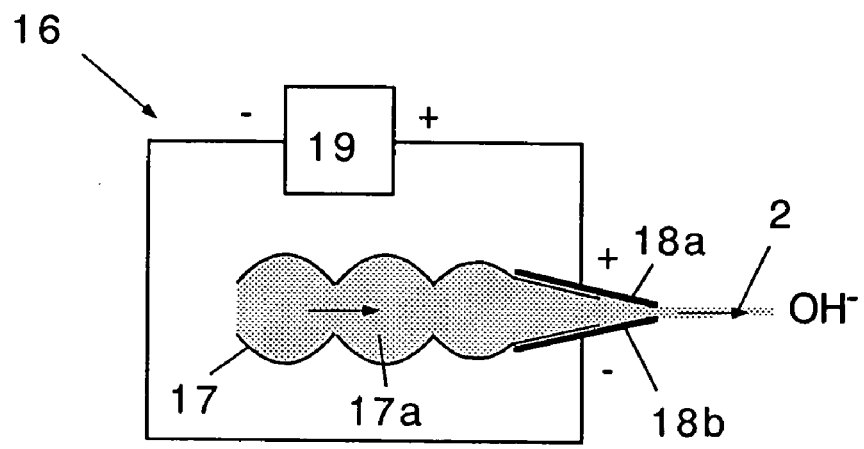
FIG. 5 is a schematic view showing a construction of an ion supply nozzle in FIG. 4.

FIG. 5 is a schematic view showing a construction of the ion supply nozzle of FIG. 4. In FIG. 5, the ion supply nozzle 16 has a function of supplying an electrolytic medium containing hydroxyl ions (OH⁻), to the surface of the conductive grindstone 12. The ion supply nozzle 16 includes a nozzle main body 17 having therein a flow passage 17a; at least one pair of nozzle electrodes 18a and 18b; and a nozzle power source 19.

The electrolytic medium may be a conductive alkali aqueous solution or a mist thereof.

The nozzle main body 17 supplies the electrolytic medium 2 (a liquid or a mist) through the flow passage 17a to the surface of the conductive grindstone 12. The pair of nozzle electrodes 18a and 18b are electrically insulated from the nozzle main body 17, and disposed in the flow passage 17a to be opposed to each other. The nozzle power source 19 applies an ionization voltage to the pair of nozzle electrodes 18a and 18b. The ionization voltage is preferably a DC pulse voltage though it may be a constant voltage or an AC voltage.

In this embodiment, the pair of nozzle electrodes 18a and 18b are opposed so as to be perpendicular to the flow passage 17a and gradually decrease the distance between the electrodes. Although each nozzle electrode can be made of any conductive material such as metal, it is preferably made of a metal or the like, superior in corrosion resistance.

Figure 6:
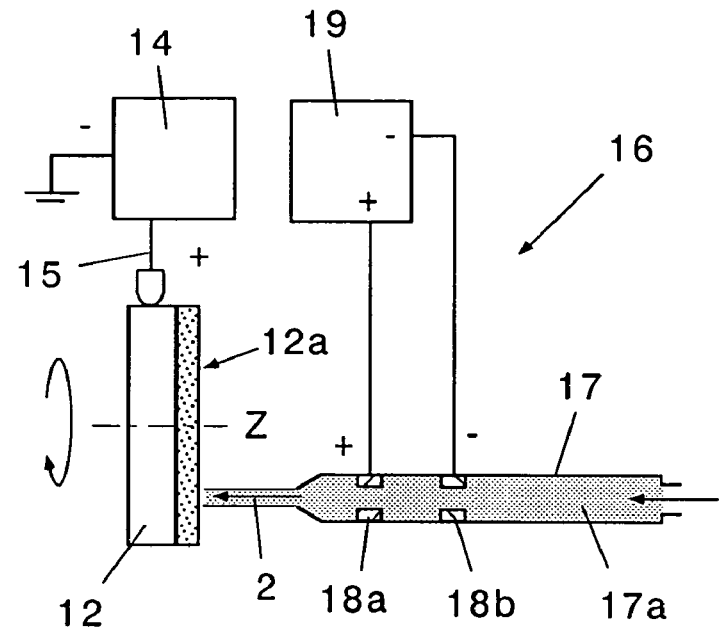
FIG. 6 is a schematic view showing another construction of the ion supply nozzle in FIG. 4.

FIG. 6 is a schematic view showing another construction of the ion supply nozzle. In this example, a pair of ring-shaped nozzle electrodes 18a and 18b are disposed along the flow passage in the nozzle. The nozzle 16 jets hydroxyl ions (OH⁻) with an electrolytic medium 2 (e.g., a grinding lubricant or a mist thereof) onto the surface of the grindstone.

The arrangement of electrodes is not limited to the above examples. They may be disposed parallel so as to be perpendicular to the flow passage, or may be in another arrangement. In FIG. 6, the conductive grindstone 12 is a disk-shaped grindstone that rotates around the axis Z. However, the grinding surface of the present invention is not limited to that. The grinding surface of the present invention may have any of flat, arc, and other shapes.

In FIG. 4, the nozzle type ELID grinding apparatus 10 of the present invention further includes a grinding lubricant supply nozzle 20. The grinding lubricant supply nozzle 20 is provided with no pair of nozzle electrodes 18a and 18b and no nozzle power source 19. The grinding lubricant supply nozzle 20 supplies a grinding lubricant to the vicinity of the contact portion of the surface of the conductive grindstone 12 with the workpiece 1.

By the provision of the grinding lubricant supply nozzle 20, the electrolytic medium 2 can be washed away from the surface of the conductive grindstone 12. Thus, in the case of the workpiece 1 made of a conductive material, the provision of the grinding lubricant supply nozzle 20 can reduce corrosion of the workpiece 1 caused by hydroxyl ions (OH−) remaining in the electrolytic medium 2. As a matter of course, the grinding lubricant brings about lubrication/cooling effect to make the grinding work smooth.

Figure 7:
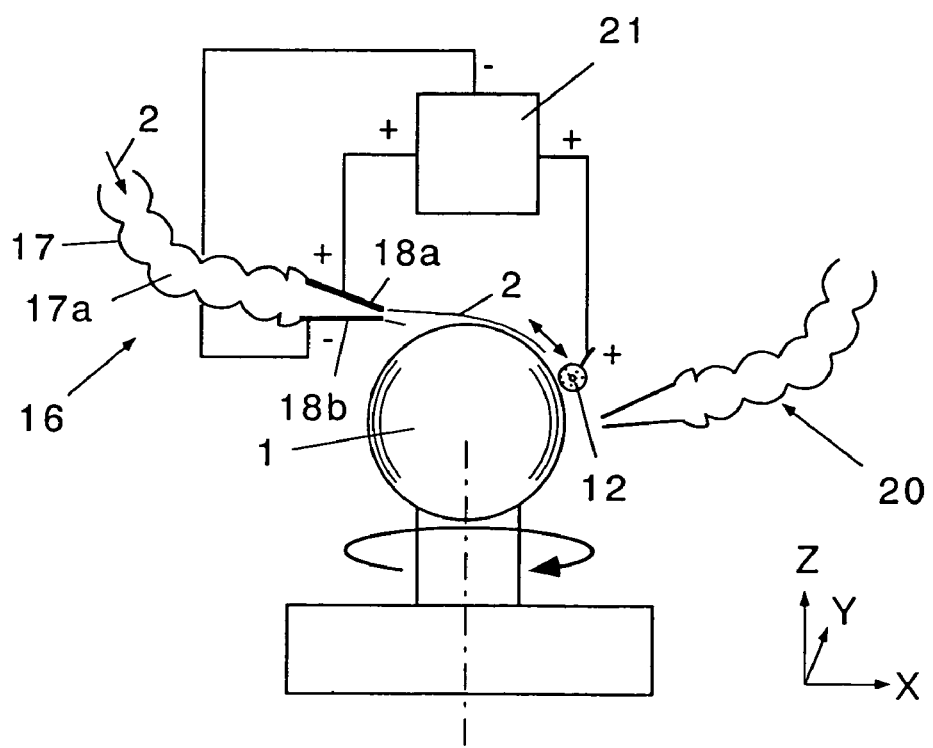
FIG. 7 is a schematic view of a nozzle type ELID grinding apparatus according to a second embodiment of the present invention.

FIG. 7 is a schematic view of a nozzle type ELID grinding apparatus according to a second embodiment of the present invention. In this embodiment, a spherical workpiece 1 is ground. The lower end portion of the workpiece 1 is rotated with a shaft rotating around the Z axis. A conductive grindstone 12 has a small-diameter columnar shape having its diameter of 5 mm. The conductive grindstone 12 is rotated around the Y axis and numerically controlled in the X-Z plane.

In this embodiment, the grindstone power source 14 and the nozzle power source 19 are united to constitute a single ELID power source 21.

Figure 8A:
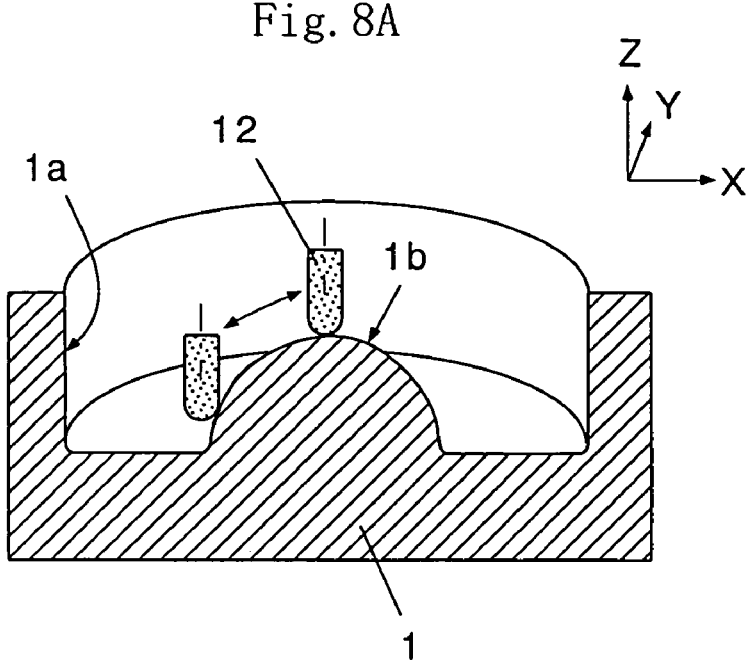
FIGS. 8A to 8D are schematic views of a nozzle type ELID grinding apparatus according to a third embodiment of the present invention.

FIG. 8A is a schematic view of a nozzle type ELID grinding apparatus according to a third embodiment of the present invention. In this embodiment, a dimpled mirror is ground as a workpiece 1, which has a semispherical convex portion 1b on the bottom of a cylindrical recess 1a. The diameter of the cylindrical recess 1a of the dimpled mirror is 2 to 3 mm, and the diameter of the semispherical convex portion 1b is about 1 mm. A conductive grindstone 12 has a 100 μm-diameter columnar shape whose lower end face is spherical. The conductive grindstone 12 is rotated around the Z axis, and numerically controlled on three axes of X, Y, and Z axes to grind the outer surface of the semispherical convex portion into a mirror surface.

In this embodiment, the grindstone power source 14 and the nozzle power source 19 are like in the first or second embodiment though not shown.

Figure 8B:
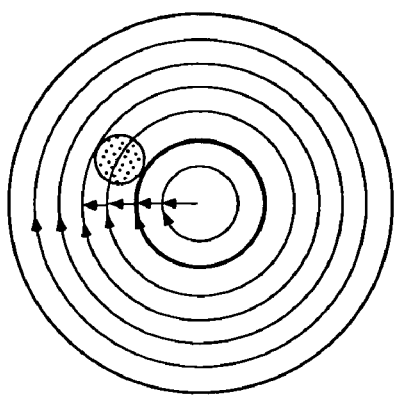
Figure 8C:
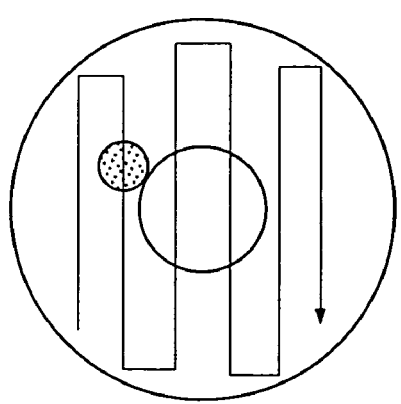
Figure 8D:
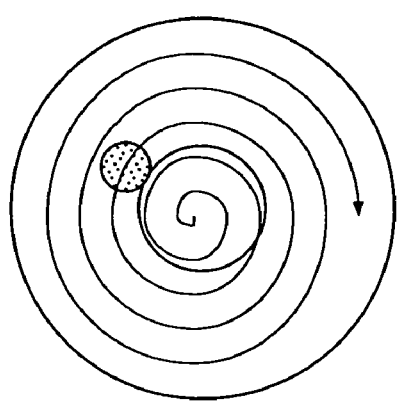

In grinding, the machining path of the lower end of the conductive grindstone 12 may be any of a contour machining path as shown in FIG. 8B; a scan machining path as shown in FIG. 8C; and a spiral machining path as shown in FIG. 8D.

Figure 9A:
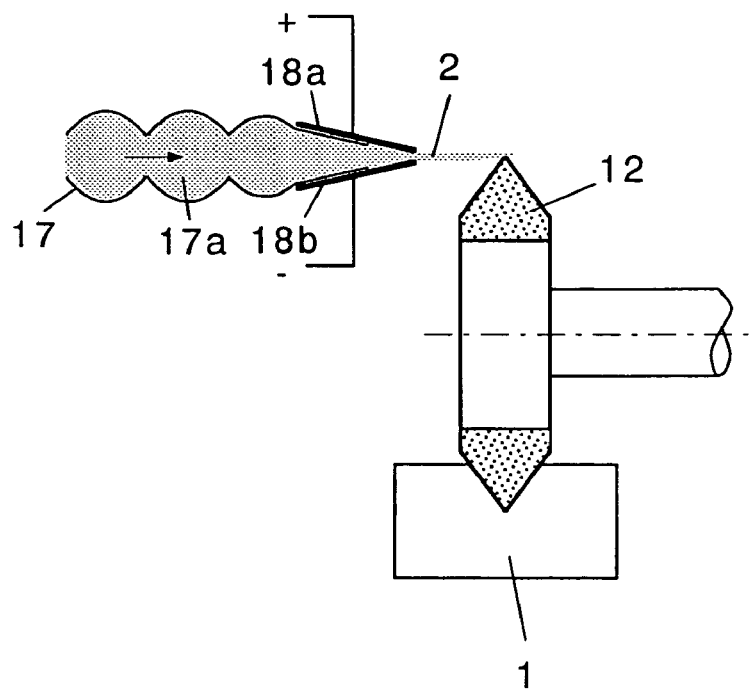
FIGS. 9A to 9C are schematic views of nozzle type ELID grinding apparatus according to fourth to sixth embodiments of the present invention.

FIG. 9A is a schematic view of a nozzle type ELID grinding apparatus according to a fourth embodiment of the present invention. In this embodiment, a mold, an optical element (e.g., a Fresnel lens), or the like, is ground as a workpiece 1. As a conductive grindstone 12 used is a both-side oblique V-shaped grindstone. A one-side oblique V-shaped grindstone can be used likewise. Further, the same can apply also to a full profile grindstone having a plurality of V-shapes in section in accordance with the sectional shape of a Fresnel lens.

In a conventional electrode type, the grinding lubricant and electrolysis inevitably concentrate too much between the electrode and the tip end of the grindstone. There is a problem that the shape is deformed in electrolytic dressing even though truing into sharpness was performed.

However, the present invention can solve such a problem. That is, a grindstone on which edges have been trued into sharpness can be dressed without breaking down the sharpness.

Figure 9B:
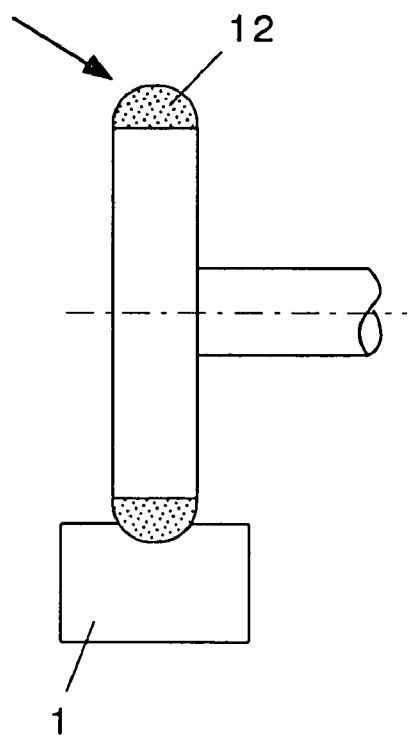

FIG. 9B is a schematic view of a nozzle type ELID grinding apparatus according to a fifth embodiment of the present invention. In this embodiment, a mold or one of various structural parts is ground as a workpiece 1. For example, a full profile grindstone is used as a conductive grindstone 12. A full profile grindstone may be used that has its section in which a curved surface as shown in FIG. 9B and a V-shape are combined.

Figure 9C:
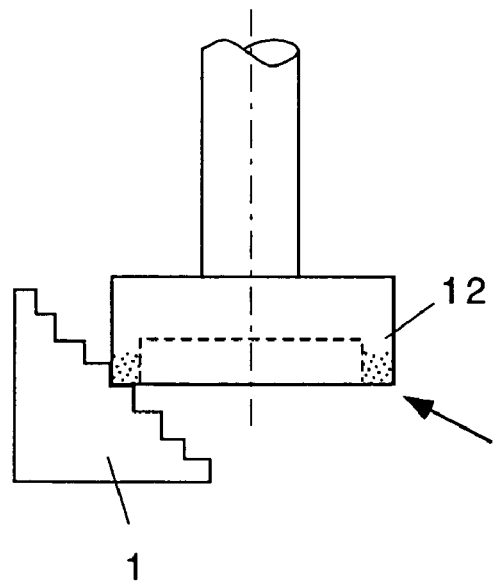

FIG. 9C is a schematic view of a nozzle type ELID grinding apparatus according to a sixth embodiment of the present invention. In this embodiment, a mold, an optical element (diffraction grating), or the like, is ground as a workpiece 1.

In either of FIGS. 9B and 9C, an arrow indicates a direction in which a grinding lubricant is jetted from a nozzle.

Either of the embodiments of FIGS. 9A and 9B brings about an effect that the grindstone having sharp edges or a specific shape can be properly dressed with keeping the shape.

Figure 10:
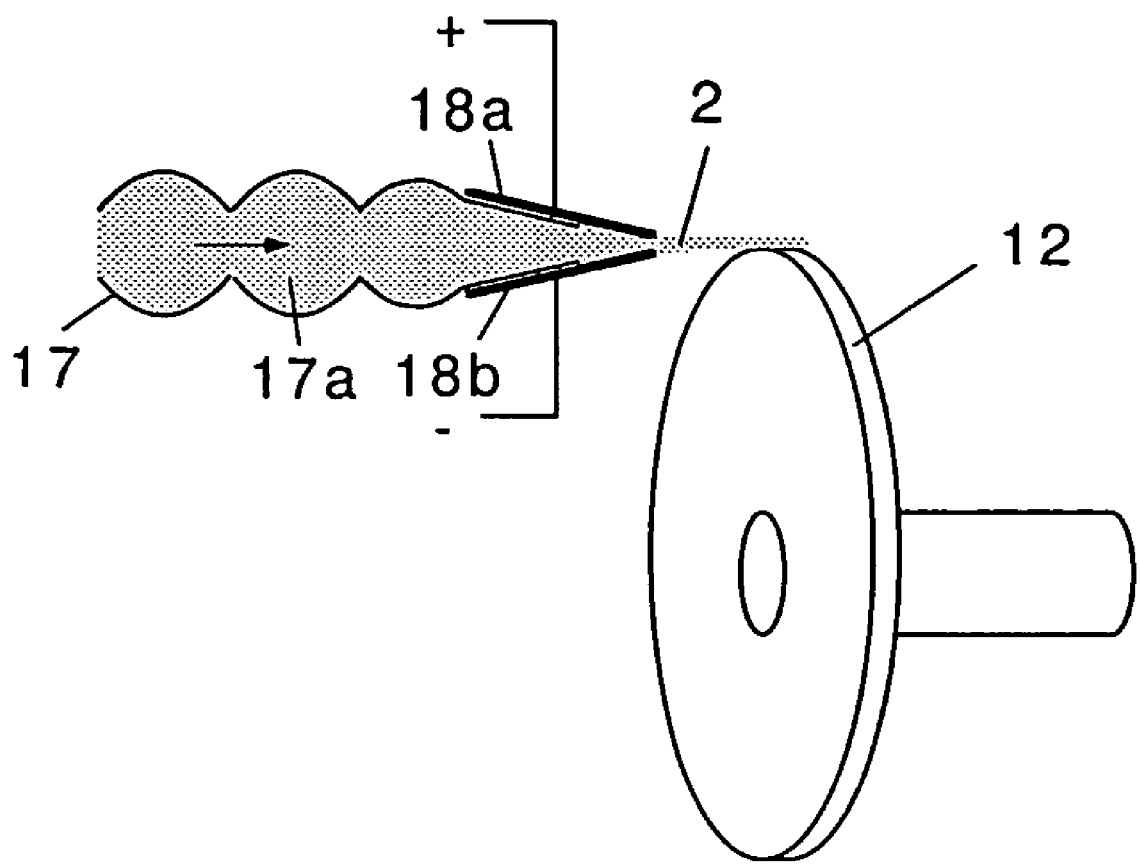
FIG. 10 is a schematic view of a nozzle type ELID grinding apparatus according to a seventh embodiment of the present invention.

FIG. 10 is a schematic view of a nozzle type ELID grinding apparatus according to a seventh embodiment of the present invention. In this embodiment, a thin grindstone for cutting or making a narrow groove is used as a conductive grindstone 12.

In the case of such a thin grindstone, a conventional electrode type has a problem that it is hard to fabricate electrodes at a narrow interval for pinching the grindstone and it is hard to control the gap from the electrodes.

By application of nozzle type ELID grinding according to the present invention, proper and easy dressing can be realized.

EXAMPLE 1

By using the apparatus as shown in FIG. 4, conventional ELID grinding using a grindstone-opposed electrode and nozzle type ELID grinding according to the present invention were carried out.

Table 1 shows a used grindstone, a used material to be ground, and a used electrolytic medium. Table 2 shows working conditions. In nozzle type ELID grinding according to the present invention, a grindstone power source and a nozzle power source were used together. In conventional ELID grinding, the grindstone power source was applied between the grindstone-opposed electrode and the grindstone. The other conditions were the same.

TABLE 1

| Grindstone | Cast iron bond grindstone Shape: 75 mm in diameter/5 mm in thickness Abrasive grain: diamond (# 4000) Bonding material: cast iron |
|---|---|
| Material to be ground | SKD 11 |
| Electrolytic medium | Grinding lubricant for ELID NX-CL-CG7 (diluted 50 times) |

TABLE 2

| Rotational speed of grindstone | 3000 rpm |
|---|---|
| Depth of cutting | 0.001 mm/pass |
| Total depth of cutting | 0.09 mm |
| Feed speed | 100 mm/min |
| Grindstone power source | No-load voltage: 30 V Maximum current: 5 A Pulse ON/OFF time: 2/2 μsec |
| Nozzle power source | No-load voltage: 90 V Maximum current: 10 A Pulse ON/OFF time: 2/2 μsec |

Table 3 is a comparison table of the surface roughness and the grinding efficiency ratio obtained in this example. In Table 3, the grinding ratio represents the ratio of the working speed to grinding to which ELID grinding is not applied.

From Table 3, it was confirmed that smooth surface roughness near a mirror surface competing with conventional ELID grinding could be obtained by the present invention. In addition, it was confirmed that the grinding ratio was double or more higher than that in the case of not applying ELID grinding though the grinding ratio was inferior to that of conventional ELID grinding.

In the case of not applying ELID grinding, when working was carried out under the same conditions, the working resistance rose sharply in the stage of nearly 1/3 of the total cutting depth of 90 μm, and an overload trouble occurred on a spindle. Contrastingly in nozzle type ELID grinding according to the present invention, the working resistance was kept low to the final stage, and it was confirmed that working could be performed without glazing and clogging of the grindstone.

TABLE 3

|  | Invention | Prior art |
|---|---|---|
| Grindstone-opposed electrode | Not used | Used |
| Nozzle electrode pair | Used | Not used |
| Surface roughness | Ra 0.028 μm | Ra 0.020 μm |
|  | Ry 0.11 μm | Ry 0.095 μm |
| Grinding efficiency ratio | 2.2 | 7.0 |

EXAMPLE 2

By using the apparatus as shown in FIG. 7 and a 5 mm-diameter conductive grindstone 12, an about 30 mm-diameter spherical surface was ground with the grindstone of #2000.

As a result, a very superior mirror surface was obtained with the roughness parallel to the grinding direction: Ra 0.18 μm and Ry 1.0 μm, and the roughness perpendicular to the grinding direction: Ra 0.16 μm and Ry 0.9 μm. Further, a grindstone with very fine grains can be applied.

As described above, in the method and apparatus for nozzle type ELID grinding, a nozzle electrode pair of (+) and (−) is provided at the tip end of the grinding lubricant nozzle, and OH⁻ ions are supplied to the grinding surface by electrolysis of water in the grinding lubricant.

At this time, when a (+) voltage (as a (+) voltage relative to the (−) electrode) is applied to the (+) electrode, conductive components of the conductive grindstone are attracted to OH⁻ ions and going to positively react with the OH⁻ ions and be dissolved out. Thus, because they are converted into nonconductors attendant upon (+) ionization, dressing (ELID) of the grindstone becomes possible.

Therefore, the present invention can cope with reduction in size of a grindstone. In addition, because the outer peripheral portion of the grindstone can be made free by setting an electrode at the tip end of a nozzle, grinding by using the whole circumference of the grindstone can be made in addition to the reduction in size of the grindstone.

Although a (+) voltage is desirably being applied to the grindstone, it is not always required. That is, because an alkali aqueous solution is used as the grinding lubricant, metallic components of the metal bond grindstone are in an environment in which they are easy to be dissolved out as cations into the alkali aqueous solution. In the environment, when OH⁻ ions are supplied, they can react with metallic ions on the surface of the grindstone as follows:

$$M + nOH^- \rightarrow M(OH)_n + ne^- \quad (1)$$

wherein M represents a conductive component (metal or the like) of the grindstone, and OH⁻ are produced and supplied by:

$$H_2O \rightarrow H^+ + OH^- \quad (2) \text{ (electrolysis of water)}.$$

As a matter of course, it is desirable for control of the quantity of dressing that the potential of the grindstone can be controlled. However, it is not always required.

The present invention is never limited to the above-described examples and embodiments. It is a matter of course that various changes, modifications, and alternations can be made within the scope of the invention.

What is claimed is:

1. A nozzle type ELID grinding method comprising:
   (1) providing an ion supply nozzle including (a) a nozzle main body with a flow passage; (b) a pair of nozzle electrodes; and (c) a nozzle power source, wherein the pair of nozzle electrodes is disposed in the flow passage of the ion supply nozzle so as to be opposed to each other, and the nozzle power source applies an ion voltage to the pair of nozzle electrodes;
   (2) supplying an electrolytic medium containing hydroxyl ions (OH⁻) from the flow passage of the ion supply nozzle onto a surface of a conductive grindstone; and
   (3) grinding a workpiece while the surface of the grindstone is dressed by electrolysis or chemical reaction.

2. The method according to claim 1, further comprising setting the conductive grindstone having a contact surface with the workpiece to be a positive potential (+).

3. The method according to claim 1, wherein the electrolytic medium is an alkali aqueous solution or a mist thereof.

4. A nozzle type ELID grinding apparatus comprising:
   (1) a conductive grindstone having a contact surface with a workpiece;
   (2) an ion supply nozzle including (a) a nozzle main body with a flow passage; (b) a pair of nozzle electrodes; and (c) a nozzle power source, wherein the pair of nozzle electrodes is disposed in the flow passage of the ion supply nozzle so as to be opposed to each other, and the nozzle power source applies an ion voltage to the pair of nozzle electrodes;
   (3) a supply of an electrolytic medium containing hydroxyl ions (OH⁻) disposed so that the electrolytic medium is supplied from the flow passage of the ion supply nozzle onto a surface of the conductive grindstone, wherein while grinding a workpiece the surface of the grindstone is dressed by electrolysis or chemical reaction.

5. The apparatus according to claim 4, further comprising a grindstone power source that sets the conductive grindstone to be a positive voltage (+).

6. The apparatus according to claim 4, wherein the pair of nozzle electrodes is opposed so as to be perpendicular to the flow passage of the ion supply nozzle and the distance between the electrodes is gradually decreased toward an opening of the ion supply nozzle.

7. The apparatus according to claim 4, wherein the pair of nozzle electrodes has a ring shape, which is disposed along the flow passage of the ion supply nozzle.

8. The method according to claim 1, wherein the pair of nozzle electrodes defines an opening of the ion supply nozzle through which the electrolytic medium flows to the conductive grinding stone.

9. The apparatus according to claim 4, wherein the pair of nozzle electrodes defines an opening of the ion supply nozzle through which the electrolytic medium flows to the conductive grinding stone.

10. The method according to claim 1, wherein surface roughness of the workpiece after grinding the workpiece is 0.28 μm of Ra and 0.11 μm of Ry.

11. The method according to claim 1, wherein grinding efficiency ratio during grinding the workpiece is 2.2, wherein a grinding efficiency ratio is defined as a ratio of a working speed of grinding a workpiece in the nozzle type ELID grinding method to a working speed of grinding a workpiece when a nozzle type ELID grinding method is not applied.

* * * * *